US010434491B2

(12) United States Patent
Hyung et al.

(10) Patent No.: US 10,434,491 B2
(45) Date of Patent: Oct. 8, 2019

(54) RELEASE RESISTANT MOISTURE ABSORBENT FOR AUTOMOBILE LAMP, AND MOISTURE ABSORBENT PRODUCT COMPRISING THE SAME

(71) Applicant: Desiccant Co., Ltd., Daejeon (KR)

(72) Inventors: Sin Jong Hyung, Daejeon (KR); Min Jae Sung, Daejeon (KR); Jong-Hyup Kim, Seoul (KR)

(73) Assignee: DesiKhan Co., Ltd., Daejeon (KR)

( * ) Notice: Subject to any disclaimer, the term of this patent is extended or adjusted under 35 U.S.C. 154(b) by 0 days.

(21) Appl. No.: 15/921,081

(22) Filed: Mar. 14, 2018

(65) Prior Publication Data

US 2018/0353931 A1    Dec. 13, 2018

(30) Foreign Application Priority Data

Jun. 8, 2017  (KR) .................. 10-2017-0071536

(51) Int. Cl.
| | |
|---|---|
| *B01J 20/26* | (2006.01) |
| *B01J 20/04* | (2006.01) |
| *B01J 20/28* | (2006.01) |
| *B01J 20/22* | (2006.01) |
| *B01D 53/28* | (2006.01) |

(52) U.S. Cl.
CPC ............ *B01J 20/046* (2013.01); *B01D 53/28* (2013.01); *B01J 20/041* (2013.01); *B01J 20/043* (2013.01); *B01J 20/223* (2013.01); *B01J 20/261* (2013.01); *B01J 20/262* (2013.01); *B01J 20/28004* (2013.01); *B01J 20/2805* (2013.01); *B01J 2220/46* (2013.01)

(58) Field of Classification Search
CPC ...... B01J 20/046; B01J 20/261; B01J 20/223; B01J 20/041; B01J 20/2805
USPC .......................................... 502/402
See application file for complete search history.

(56) References Cited

U.S. PATENT DOCUMENTS

| | | | | |
|---|---|---|---|---|
| 5,244,735 A * | 9/1993 | Kimura | ............ | C08F 2/32 428/402 |
| 6,113,927 A * | 9/2000 | Hatakeyama | ........... | B32B 15/08 424/401 |
| 8,236,715 B2 * | 8/2012 | Schmidt | ............ | A61L 15/26 427/2.31 |
| 2006/0276765 A1 * | 12/2006 | Swerev | ............ | A61F 13/42 604/361 |
| 2008/0012172 A1 * | 1/2008 | Merical | ............ | B29C 45/1646 264/254 |

(Continued)

FOREIGN PATENT DOCUMENTS

| | | |
|---|---|---|
| JP | 2010-076826 A | 4/2010 |
| KR | 0126132 Y1 | 4/1999 |

(Continued)

*Primary Examiner* — Haytham Soliman
(74) *Attorney, Agent, or Firm* — Norton Rose Fulbright US LLP; James R. Crawford

(57) ABSTRACT

Provided are a release resistant moisture absorbent being environment-friendly and having excellent moisture absorbency and release resistance, and a moisture absorbent product comprising the same. The release resistant moisture absorbent of the present invention has an excellent moisture absorption rate, and also excellent release resistance in a high temperature and low humidity condition which is a driving environment of an automobile lamp, and thus, may be usefully used for an automobile lamp.

6 Claims, 2 Drawing Sheets

(56) References Cited

U.S. PATENT DOCUMENTS

2012/0193576 A1* 8/2012 Muramoto ............ B65D 25/14
                                                                                                     252/194

FOREIGN PATENT DOCUMENTS

| KR | 10-0737026 B1 | 7/2007 |
|---|---|---|
| KR | 10-1031518 B1 | 4/2011 |
| KR | 2012-0018995 A | 3/2012 |
| KR | 2012-0093059 A | 8/2012 |
| KR | 2013-0009723 A | 1/2013 |
| KR | 2013-0027402 A | 3/2013 |
| KR | 2013-0084019 A | 7/2013 |
| KR | 101481733 B1 | 1/2015 |
| KR | 20150058825 A | 5/2015 |
| KR | 10-1567242 B1 | 11/2015 |

* cited by examiner

RELEASE RESISTANT MOISTURE ABSORBENT FOR AUTOMOBILE LAMP, AND MOISTURE ABSORBENT PRODUCT COMPRISING THE SAME

CROSS-REFERENCE TO RELATED APPLICATIONS

This application claims priority under 35 U.S.C. § 119 to Korean Patent Application No. 10-2017-0071536, filed on Jun. 8, 2017, in the Korean Intellectual Property Office, the disclosure of which is incorporated herein by reference in its entirety.

TECHNICAL FIELD

The following disclosure relates to a release resistant moisture absorbent, and a moisture absorbent product comprising the same. More particularly, the following disclosure relates to a release resistant moisture absorbent for an automobile lamp being environment-friendly and having excellent moisture absorbency and release resistance, and a moisture absorbent product comprising the same.

BACKGROUND

In general, as the automotive industry develops, problems of condensation in headlamps, rear lamps, fog lights and the like during transportation and storage of automobiles continuously occur, which causes increased industrial loss.

In an automotive lamp, when temperature difference between inside and outside parts is big in a high humidity environment such as in the rain, moisture inside the lamp condenses so that fine water drops occur on the inner surface of the lens to induce fogging. A light scattering phenomenon resulting therefrom becomes a big obstacle to safely driving cars.

Generally, in order to solve the problem, a method of mounting an anti-fog coating agent and a bentonite-based moisture absorbent in a housing of the lamp and using them has been used in the current automotive industry. However, the anti-fog coating agent undergoes deterioration such as whitening or a flowing phenomenon by outdoor UV, temperature, humidity and the like, and in this case, an automobile lamp module should be replaced. In addition, after absorbing a certain amount of moisture, a general bentonite-based moisture absorbent re-releases moisture in a high temperature and low humidity environment during operation of the lamp, thereby causing condensation on the inner surface of the lamp lens.

Due to the above problems caused by the use of the conventional anti-fog coating agent and the bentonite-based moisture absorbent, replacement costs for the automobile lamp module are incurred, and functional quality and consumer quality deteriorate. Accordingly, in order to improve the condensation problem of the conventional moisture absorbent, a moisture absorbent having a new function which may minimize moisture release or absorb moisture even in a high temperature and low humidity driving environment is demanded.

RELATED ART DOCUMENT

Patent Document

Korean Patent Laid-Open Publication No. 10-2015-0058825
Korean Patent Registration No. 10-1481733
Korean Patent Laid-Open Publication No. 10-2013-0009723
Korean Patent Laid-Open Publication No. 10-2013-0084019
Korean Patent Laid-Open Publication No. 10-2013-0027402
Korean Patent Registration No. 10-1031518
Korean Patent Registration No. 10-0737026
Korean Patent Laid-Open Publication No. 10-2012-0018995
Korean Patent Registration No. 10-1567242
Korean Utility Model Registration No. 20-0126132

SUMMARY

An embodiment of the present invention is directed to providing a release resistant moisture absorbent being environmental-friendly and having excellent moisture absorbency and release resistance. More specifically, an embodiment of the present invention is directed to providing a release resistant moisture absorbent which has an excellent moisture absorption rate, minimizes re-release of absorbed moisture in a high temperature and low humidity environment, and also, may secure continuous moisture absorbency.

Another embodiment of the present invention is directed to providing a moisture absorbent product comprising the release resistant moisture absorbent.

In one general aspect, a release resistant moisture absorbent comprises: (A) a moisture absorbent material comprising at least one selected from the group consisting of magnesium chloride, calcium chloride, and sodium carbonate; (B) a curable inorganic material comprising at least one selected from the group consisting of calcium oxide, magnesium oxide having a particle size of 20 to 80 mesh, and magnesium oxide having a particle size of 200 to 500 mesh; and (C) an additive comprising at least one polymer wax selected from the group consisting of polyethylene wax, polypropylene wax, polyamide wax, carnauba wax, paraffin wax, and polytetrafluoroethylene wax.

According to an exemplary embodiment of the present invention, the release resistant moisture absorbent may comprise: 10 wt % to 40 wt % of (A) the moisture absorbent material; 10 wt % to 60 wt % of (B) the curable inorganic material; and 3 wt % to 70 wt % of (C) the additive.

According to another exemplary embodiment of the present invention, the release resistant moisture absorbent may be for an automobile lamp.

According to another exemplary embodiment of the present invention, (C) the additive may further comprise at least one material selected from the group consisting of a low-density polyethylene resin and metal stearate.

According to another exemplary embodiment of the present invention, the low-density polyethylene resin may have a melt index according to ASTM D1238 of 5 to 30 g/10 min.

According to another exemplary embodiment of the present invention, the metal stearate may be at least one selected from the group consisting of calcium stearate and magnesium stearate.

According to another exemplary embodiment of the present invention, the release resistant moisture absorbent may be a granular type or powder type.

In another general aspect, a moisture absorbent product comprises the release resistant moisture absorbent of the present invention.

According to an exemplary embodiment of the present invention, the moisture absorbent product may comprise the release resistant moisture absorbent of the present invention filled in an air permeable packaging material.

According to another exemplary embodiment of the present invention, the packaging film of the air permeable packaging material may comprise at least one selected from the group consisting of polypropylene (PP) non-woven fabric, high-density polyethylene (HDPE) non-woven fabric, a high-density polyethylene (HDPE) film, low-density polyethylene (LDPE) non-woven fabric, a low-density polyethylene (LDPE) film, polyethyleneterephthalate (PET) non-woven fabric, paper, and cloth.

According to another exemplary embodiment of the present invention, the packaging film of the air permeable packaging material may be in a laminated form comprising at least two selected from the group consisting of polypropylene (PP) non-woven fabric, high-density polyethylene (HDPE) non-woven fabric, a high-density polyethylene (HDPE) film, low-density polyethylene (LDPE) non-woven fabric, a low-density polyethylene (LDPE) film, polyethyleneterephthalate (PET) non-woven fabric, paper, and cloth.

DETAILED DESCRIPTION OF EMBODIMENTS

Figure 1:
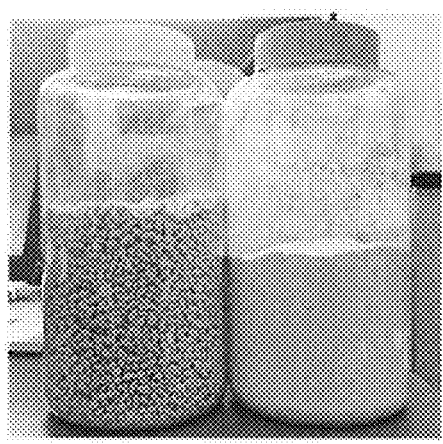
FIG. 1 represents a shape of contents of the release resistant moisture absorbent of the present invention, in which a granular type is on the left, and a powder type is on the right.

Hereinafter, the release resistant moisture absorbent according to the present invention, and the moisture absorbent product comprising the same will be described in more detail with reference to the specific examples or exemplary embodiments comprising the accompanying drawings. However, the following exemplary embodiments and Examples are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains, the terms used herein are only for effectively describing a certain exemplary embodiment, and not intended to limit the present invention.

In addition, the drawings to be provided below are provided by way of example so that the idea of the present invention can be sufficiently transferred to a person skilled in the art to which the present invention pertains. Therefore, the present invention is not limited to the drawings provided below but may be modified in many different forms. In addition, the drawings suggested below will be exaggerated in order to clear the spirit and scope of the present invention. In addition, like reference numerals denote like elements throughout the specification.

In addition, the singular form used in the specification and claims appended thereto may be intended to also comprise a plural form, unless otherwise indicated in the context. The word 'comprises' and/or 'comprising' used herein comprise the mentioned elements, but do not exclude the presence or addition of any other one or more elements.

(Release Resistant Moisture Absorbent)

The present invention provides a release resistant moisture absorbent comprising: (A) a moisture absorbent material comprising at least one selected from the group consisting of magnesium chloride, calcium chloride, and sodium carbonate; (B) a curable inorganic material comprising at least one selected from the group consisting of calcium oxide, magnesium oxide having a particle size of 20 to 80 mesh, and magnesium oxide having a particle size of 200 to 500 mesh; and (C) an additive comprising at least one polymer wax selected from the group consisting of polyethylene wax, polypropylene wax, polyimide wax, carnauba wax, paraffin wax, and polytetrafluoroethylene wax.

The release resistant moisture absorbent of the present invention may comprise preferably 10 wt % to 40 wt % of (A) the moisture absorbent material; 10 wt % to 60 wt % of (B) the curable inorganic material; and 3 wt % to 70 wt % of (C) the additive.

In order to impart moisture absorbency, the release resistant moisture absorbent of the present invention may comprise a moisture absorbent material comprising at least one selected from the group consisting of magnesium chloride, calcium chloride, and sodium carbonate, and besides, a moisture absorbent material such as quicklime known in the art of the present invention may be further comprised.

The release resistant moisture absorbent of the present invention may comprise preferably 10 wt % to 40 wt % of (A) the moisture absorbent material comprising at least one selected from the group consisting of magnesium chloride, calcium chloride, and sodium carbonate. When the content of (A) the absorbent material is less than 10 wt %, the moisture absorptivity of the prepared moisture absorbent may be deteriorated, and when the content of (A) the absorbent material is more than 40 wt %, the prepared moisture absorbent is liquefied due to excessive moisture absorption, so that product stability may not be secured.

In order to prevent the prepared moisture absorbent from being liquefied by a deliquescent property after moisture absorption, the release resistant moisture absorbent of the present invention comprises: a curable inorganic material (B) comprising at least one selected from the group consisting of calcium oxide, magnesium oxide having a particle size of 20 to 80 mesh, and magnesium oxide having a particle size of 200 to 500 mesh. When (B) the curable inorganic material is magnesium oxide, STARMAG 50 available from KONOSHIMA CHEMICAL, and NOV60 available from NOV may be used.

The release resistant moisture absorbent of the present invention may comprise preferably 10 wt % to 60 wt % of (B) the curable inorganic material comprising at least one selected from the group consisting of calcium oxide, magnesium oxide having a particle size of 20 to 80 mesh, and magnesium oxide having a particle size of 200 to 500 mesh. When the content of (B) the curable inorganic material is less than 10 wt %, separation of the deliquescent moisture absorbent may not be suppressed, and when the content of (B) the curable inorganic material is more than 60 wt %, the moisture absorption rate of the product may be deteriorated.

In order to adjust the physical properties, the release resistant moisture absorbent of the present invention comprises (C) the additive comprising at least one polymer wax selected from the group consisting of polyethylene wax, polypropylene wax, polyamide wax, carnauba wax, paraffin wax, and polytetrafluoroethylene wax. In the case of the polyethylene wax as the polymer wax of the present invention, LH 1200 available from SFC may be used as a commercialized product. When the environmental temperature of the release resistant moisture absorbent rises, for example, the temperature inside of an automobile lamp rises, the polymer wax of the present invention serves to change to a liquid having high viscosity to suppress release of absorbed moisture, and also, it serves to adjust the moisture absorption rate of the product.

The release resistant moisture absorbent of the present invention may comprise preferably 3 wt % to 70 wt % of (C) the additive comprising at least one polymer wax selected from the group consisting of polyethylene wax, polypropylene wax, polyamide wax, carnauba wax, paraffin wax, and polytetrafluoroethylene wax. When the content of (C) the additive is less than 3 wt %, the release resistance of moisture absorbed in the moisture absorbent may be decreased, and when the content of (C) the additive is more than 70 wt %, problems such as a decreased moisture absorption rate and a moisture absorption speed of a product may occur.

In the release resistant moisture absorbent of the present invention, (C) the additive may further comprise at least one material selected from the group consisting of a low-density polyethylene resin and metal stearate. It is preferred that the low-density polyethylene resin has a melt index according to ASTM D1238 of 5 to 30 g/10 min. Within the above range of the melt index of the low-density polyethylene resin, extrusion processing for preparation of a granular type moisture absorbent, and maintaining absorption efficiency are more advantageous. The metal stearate is not particularly limited in terms of achieving the object and effect of the present invention, but preferably, may be at least one selected from the group consisting of calcium stearate and magnesium stearate.

The release resistant moisture absorbent of the present invention may be a granular type or powder type. The granular type moisture absorbent of the present invention may be prepared by adding a mixed composition comprising (A) the moisture absorbent material; (B) the curable inorganic material; and (C) the additive to an extruder heated to an average temperature of 100 to 150° C., and heating and melting the composition to be pelletized. The powder type moisture absorbent of the present invention may be prepared by applying a known method such as ball milling or crushing to the mixed composition comprising (A) the moisture absorbent material; (B) the curable inorganic material; and (C) the additive.

The release resistant moisture absorbent of the present invention comprises (A) the moisture absorbent material; (B) the curable inorganic material; and (C) the additive, thereby having an excellent moisture absorption rate, minimizing re-release of moisture absorbed in a high temperature and low humidity environmental condition, and also securing continuous moisture absorbency. The release resistant moisture absorbent of the present invention has stably excellent release resistance so that the moisture absorbed in a high temperature range of 50-80° C. is not re-released, and thus, may be usefully used as an automobile lamp such as a car headlamp, a rear lamp or a fog light.

The release resistant moisture absorbent of the present invention may be used in various packaged goods, for example, air permeable packaging materials and the like.

(Moisture Absorbent Product)

According to another exemplary embodiment of the present invention, a moisture absorbent product comprising the release resistant moisture absorbent of the present invention is provided. Preferably, the moisture absorbent product of the present invention comprises the release resistant moisture absorbent of the present invention filled in an air permeable bag, a container, a sack or a packaging material.

The air permeable packaging material comprised in the moisture absorbent product of the present invention uses a packaging film, and the shape or size of the packaging material is not particularly limited, and may be properly designed as required. In addition, the release resistant moisture absorbent of the present invention may be added to the packaging material and sealed, by heat-sealing the packaging material.

The air permeable packaging material comprised in the moisture absorbent product of the present invention comprises preferably at least two packaging films, and as the shape of the packaging material, those known to a person skilled in the art by Korean Patent Laid-Open Publication No. 10-2013-0027402, Korean Patent Laid-Open Publication No. 10-2012-0093059, Japanese Patent Laid-Open Publication No. 2010-076826, etc., may be properly used. For example, two packaging films cut into a desired shape may face each other, and the moisture absorbent may be disposed between two packaging films facing each other.

The packaging film of the air permeable packaging material comprised in the moisture absorbent product of the present invention may comprise at least one selected from the group consisting of polypropylene (PP) non-woven fabric, high-density polyethylene (HDPE) non-woven fabric, a high-density polyethylene (HDPE) film, low-density polyethylene (LDPE) non-woven fabric, a low-density polyethylene (LDPE) film, polyethyleneterephthalate (PET) non-woven fabric, paper, and cloth.

Preferably, the packaging film of the air permeable packaging material comprised in the moisture absorbent product of the present invention may be in a laminated form comprising at least two selected from the group consisting of polypropylene (PP) non-woven fabric, high-density polyethylene (HDPE) non-woven fabric, a high-density polyethylene (HDPE) film, low-density polyethylene (LDPE) non-woven fabric, a low-density polyethylene (LDPE) film, polyethyleneterephthalate (PET) non-woven fabric, paper, and cloth.

More preferably, the packaging film of the air permeable packaging material comprised in the moisture absorbent product of the present invention may be in a thermal laminated form comprising at least two selected from the group consisting of high-density polyethylene (HDPE) non-woven fabric, a high-density polyethylene (HDPE) film, low-density polyethylene (LDPE) non-woven fabric and a low-density polyethylene (LDPE) film. Accordingly, after thermal-laminating at least two materials selected from the above, perforation was formed on the material in a laminated form thereby manufacturing the air permeable packaging film. By the use of the air permeable packaging film in the thermal laminated form, excellent thermal resistance of the packaging material is secured, and excellent release resistance of the filled moisture absorbent of the present invention may be more stably maintained.

In the case of the high-density polyethylene non-woven fabric, Tyvek, which is available from Dupont and the like may be used as a commercialized example. The low-density polyethylene non-woven fabric may be preferably linear low-density polyethylene (LLDPE) non-woven fabric, and the low-density polyethylene film may be preferably a linear low-density polyethylene (LLDPE) film.

EXPERIMENTAL EXAMPLES

Hereinafter, the present invention will be described in more detail with reference to the Examples and Comparative Examples. However, the following Examples and Comparative Examples are only an example for describing the present invention in detail, and do not limit the present invention in any way.

The manufacturer and the physical property measurement method of the release resistant moisture absorbent of the present invention are as follows:

The manufacturers of the moisture absorbent materials used in the following Examples and Comparative Example are as shown in the following Table 1:

TABLE 1

| Classification | Compound | Manufacturer | Product Name | Physical properties of compound |
|---|---|---|---|---|
| A-1 | Magnesium chloride | Aldrich | — | Purity: 94% |
| A-2 | Calcium chloride | Aldrich | — | Purity: 94% |
| B-1 | Magnesium oxide | KONOSHIMA CHEMICAL | STARMAG 50 | Particle size: 300 mesh |
| B-2 | Magnesium oxide | NOV | NOV60 | Particle size: 60 mesh |
| B-3 | Calcium oxide | Aldrich | — | Purity: 94% |
| C-1 | Polyethylene wax | SFC | LH1200 | Softening point: 109 ± 3° C. |
| C-2 | Low-density polyethylene resin | Hanwha Chemical Corporation | 737 | Melt index (ASTM D1238): 22 g/10 min |
| C-3 | Magnesium stearate | Shinwon Chemical Co., Ltd. | HI-TECA | Melting point: 145-155° C. |

(Stability)

The specimen was exposed to a temperature of 50° C. and a relative humidity of 95% for seven days in a thermohygrostat, and then the phase separation state of the content of the specimen was evaluated with the naked eye.

○: very good (phase separation of the content does not occur after moisture absorption)

Δ: normal (partial phase separation of the content occurs after moisture absorption)

x: bad (severe phase separation of the content occurs after moisture absorption)

(Moisture Absorption Rate)

After exposing the specimen to a temperature of 50±2° C. and a relative humidity of 95±5% for seven days using a thermohygrostat, the moisture absorption rate was measured, and the moisture absorption rate was calculated by the following equation:

$$\text{Moisture absorption rate (\%)} = \frac{\text{(Final weight after exposure for a certain period} - \text{Initial weight)}}{\text{(Initial weight)}} \times 100$$

(Release Resistance)

After the specimen absorbs moisture for 48 hours under a temperature of 23±2° C. and a relative humidity of 50±5%, it is dried in an oven at 50±2° C. and 70±2° C. for two hours, and the moisture absorption rate of the specimen at each drying temperature was measured. The initial and post-drying moisture absorption rates were measured, respectively, by proceeding with the initial moisture absorption and then performing drying, and the release resistance was calculated by the following equation: As an example, the release resistance of 90% means that 90% of the initially absorbed moisture remains after drying.

$$\text{Release resistance (\%)} = \frac{\text{Absorption rate (\%) after drying}}{\text{Initial absorption rate (\%)}} \times 100$$

Examples 1 to 18

After forming a mixed composition by uniformly mixing the components by wt % as shown in the following Table 2 using a mixer, the mixed composition was added to a twin screw extruder heated to an average temperature of 120° C., and heated and melted to be pelletized, thereby preparing 25 g of granular type moisture absorbents of Examples 1, 3, 5, 7, 9, 11, 13, 15 and 17.

After forming a mixed composition by uniformly mixing the components by wt % as shown in the following Table 2 using a mixer, the mixed composition was crushed with a crusher, thereby preparing 25 g of powder type moisture absorbents of Examples 2, 4, 6, 8, 10, 12, 14, 16 and 18.

Then, the moisture absorbents of Examples 1 to 18 were added to an air permeable packaging material having a length of 100 mm and a width of 100 mm, and the packaging material was processed at a temperature of 120° C. using a heat-sealing machine, thereby preparing the specimens.

For the specimens according to Examples 1 to 18, a linear low-density polyethylene film (Daewon Sanup, Co., Ltd.: B002) was thermally laminated with high-density polyethylene non-woven fabric (Dupont: tyvek) to form a film in the laminated form, and perforation was formed thereon to manufacture an air permeable film, which was applied to the packaging material.

The moisture absorption rate, the release resistance, and the content stability were measured by the above-described method, with the physical properties of the specimens according to Examples 1 to 18, and the measured results are shown in the following Table 3.

Comparative Example

The moisture absorption rate, the release resistance and the content stability were measured in the same manner as in the Examples, using 30 g of DESI-PAK comprising the bentonite-based moisture absorbent as the conventional commercialized moisture absorbent product, and the measured results are shown in the following Table 3.

TABLE 2

| | Content (wt %) | | | | | | | | Shape of moisture absorbent | Extrusion process | Remarks |
|---|---|---|---|---|---|---|---|---|---|---|---|
| | A-1 | A-2 | B-1 | B-2 | B-3 | C-1 | C-2 | C-3 | | | |
| Example 1 | 35 | — | 39 | — | — | 10 | 15 | 1 | Granule | o | — |
| Example 2 | 35 | — | 39 | — | — | 10 | 15 | 1 | Powder | x | — |
| Example 3 | 30 | — | 44 | — | — | 10 | 15 | 1 | Granule | o | — |
| Example 4 | 30 | — | 44 | — | — | 10 | 15 | 1 | Powder | x | — |
| Example 5 | 30 | — | 20 | 24 | — | 10 | 15 | 1 | Granule | o | — |
| Example 6 | 30 | — | 20 | 24 | — | 10 | 15 | 1 | Powder | x | — |
| Example 7 | 30 | — | 20 | 34 | — | 5 | 10 | 1 | Granule | o | — |
| Example 8 | 30 | — | 20 | 34 | — | 5 | 10 | 1 | Powder | x | — |
| Example 9 | 30 | — | — | 44 | — | 10 | 15 | 1 | Granule | o | — |
| Example 10 | 30 | — | — | 44 | — | 10 | 15 | 1 | Powder | x | — |
| Example 11 | 30 | — | 30 | — | — | 40 | — | — | Granule | o | — |
| Example 12 | 30 | — | 30 | — | — | 40 | — | — | Powder | x | — |
| Example 13 | 20 | — | 20 | — | — | 60 | — | — | Granule | o | — |
| Example 14 | 20 | — | 20 | — | — | 60 | — | — | Powder | x | — |
| Example 15 | — | 35 | 39 | — | — | 10 | 15 | 1 | Granule | o | — |
| Example 16 | — | 35 | 39 | — | — | 10 | 15 | 1 | Powder | x | — |
| Example 17 | 35 | — | — | — | 39 | 10 | 15 | 1 | Granule | o | — |
| Example 18 | 35 | — | — | — | 39 | 10 | 15 | 1 | Powder | x | — |
| Comparative Example | — | — | — | — | — | — | — | — | — | — | DESI-PAK |

TABLE 3

| | Moisture absorption rate (%) | Release resistance (%) | | Stability |
|---|---|---|---|---|
| | | 50 ± 2° C. | 70 ± 2° C. | |
| Example 1 | 137.2 | 102.9 | 100.8 | Δ |
| Example 2 | 137.0 | 103.2 | 101.1 | Δ |
| Example 3 | 112.4 | 99.7 | 97.4 | o |
| Example 4 | 112.6 | 99.3 | 97.1 | o |
| Example 5 | 115.7 | 98.7 | 96.5 | o |
| Example 6 | 115.9 | 99.3 | 96.7 | o |
| Example 7 | 110.2 | 99.2 | 98.0 | o |
| Example 8 | 110.3 | 99.1 | 98.2 | o |
| Example 9 | 107.8 | 92.1 | 84.5 | o |
| Example 10 | 107.6 | 92.3 | 84.8 | o |
| Example 11 | 110.0 | 98.5 | 96.2 | o |
| Example 12 | 110.3 | 98.1 | 96.0 | o |
| Example 13 | 82.1 | 98.2 | 94.5 | o |
| Example 14 | 81.9 | 98.6 | 94.8 | o |
| Example 15 | 72.1 | 87.8 | 70.7 | x |
| Example 16 | 72.3 | 88.0 | 71.2 | x |
| Example 17 | 134.2 | 90.2 | 80.2 | Δ |
| Example 18 | 134.5 | 90.5 | 80.5 | Δ |
| Comparative Example | 33 | 88.9 | 63.1 | o |

According to the above Tables 2 and 3, it is seen that the moisture absorption rates according to the Examples of the present invention are pronounced at least twice as much as that of the Comparative Example. That is, it is seen that the release resistant moisture absorbent of the present invention according to the Examples show significantly improved moisture absorbency as compared with the conventional commercialized moisture absorbent.

Further, according to the Examples of the present invention, it is confirmed that excellent release resistance may be stably maintained, even by the change of the temperature condition from 50±2° C. to 70±2° C., under a low humidity condition of a relative humidity of 50±5%. However, it is confirmed that under the high temperature and low humidity condition as in the Examples, the release resistance was significantly decreased due to a further heated, high temperature condition, in the Comparative Example.

In particular, according to the Examples of the present invention, it is seen that the release resistance values are much better than the value of the Comparative Example in the condition of a temperature of 70±2° C. and a relative humidity condition of 50±5%. That is, as the high temperature condition heated close to 80° C. is applied, the conventional commercialized moisture absorbent according to the Comparative Example has a problem in that it is difficult to secure continuous moisture absorbency due to significant decrease of release resistance. However, even in the case that the high temperature condition heated close to 80° C. is applied, the release resistant moisture absorbent of the present invention according to the Examples has a merit of stably maintaining excellent release resistance, thereby securing continuous moisture absorbency.

In particular, since the release resistant moisture absorbent of the present invention according to the Examples has a merit of minimizing re-release of absorbed moisture under the high temperature (in a range of 50-80° C.) and low humidity environment which is the driving environment of an automobile lamp, thereby securing continuous moisture absorbency, it may be used more usefully as an automobile lamp such as a car headlamp, a rear lamp or a fog light.

Figure 2:
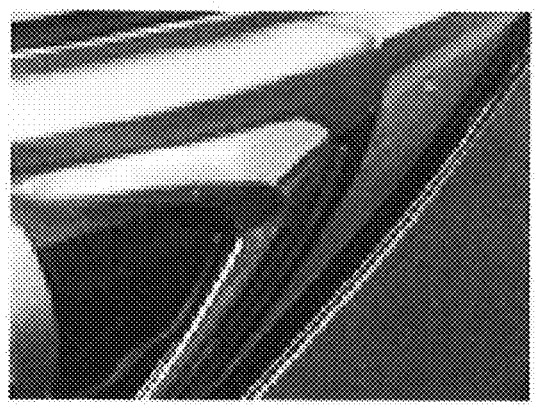
FIG. 2 represents the results of an automobile condensation performance test of an automobile lamp using the release resistant moisture absorbent of the present invention.
Figure 3:
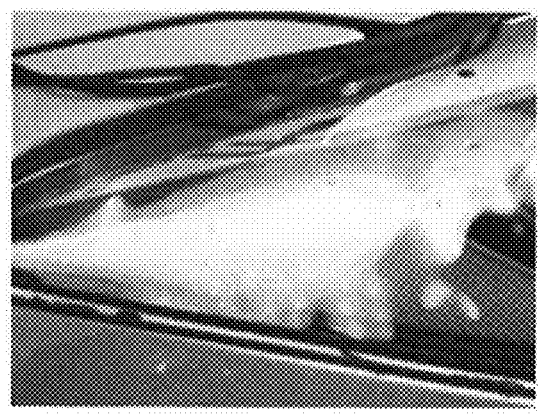
FIG. 3 represents the results of an automobile condensation performance test of an automobile lamp using a conventional commercialized moisture absorbent.

In addition, FIG. 2 represents the results of an automobile condensation performance test of an automobile lamp using the release resistant moisture absorbent according to Example 1 of the present invention, and FIG. 3 represents the results of an automobile condensation performance test of an automobile lamp using the conventional commercialized moisture absorbent according to the Comparative Example. According to FIG. 3, it is confirmed that the conventional commercialized moisture absorbent re-releases moisture under the high temperature and low humidity environment during the operation of the lamp, thereby causing condensation on the inner surface of the lamp lens. However, according to FIG. 2, it is confirmed that the condensation problem may be improved by the release resistant moisture absorbent of the present invention.

That is, according to the above Table 3, the release resistant moisture absorbent of the present invention according to the Examples has excellent moisture absorbency and release resistance as compared with the conventional commercialized moisture absorbent, thereby having greater commercial availability.

The release resistant moisture absorbent of the present invention has an excellent moisture absorption rate, minimizes re-release of moisture absorbed in a high temperature and low humidity environment, and also may secure continuous absorbency.

Further, the release resistant moisture absorbent of the present invention has excellent release resistance in a high temperature and low humidity condition which is a driving environment of an automobile lamp, and thus, may be usefully used for an automobile lamp.

What is claimed is:

1. A moisture absorbent product consisting essentially of a release resistant moisture absorbent consisting essentially of:
   (A) a moisture absorbent material consisting of at least one selected from the group consisting of magnesium chloride, calcium chloride, and sodium carbonate;
   (B) a curable inorganic material consisting of at least one selected from the group consisting of calcium oxide, magnesium oxide having a particle size of 20 to 80 mesh, and magnesium oxide having a particle size of 200 to 500 mesh; and
   (C) an additive consisting of at least one polymer wax selected from the group consisting of polyethylene wax, polypropylene wax, polyamide wax, carnauba wax, paraffin wax, and polytetrafluoroethylene wax, and optionally at least one material selected from the group consisting of a low-density polyethylene resin and metal stearate;
   wherein the release resistant moisture absorbent is granule-shaped or powder-shaped; and
   wherein the release resistant moisture absorbent is filled in an air permeable packaging material which is in a thermally laminated form comprising at least two selected from the group consisting of high-density polyethylene (HDPE) non-woven fabric, a high-density polyethylene (HDPE) film, low-density polyethylene (LDPE) non-woven fabric and a low-density polyethylene (LDPE) film.

2. The moisture absorbent product of claim 1, wherein 10 wt % to 40 wt % of (A) the moisture absorbent material; 10 wt % to 60 wt % of (B) the curable inorganic material; and 3 wt % to 70 wt % of (C) the additive are comprised in the release resistant moisture absorbent.

3. The moisture absorbent product of claim 1, wherein the release resistant moisture absorbent is for an automobile lamp.

4. The moisture absorbent product of claim 1, wherein the low-density polyethylene resin has a melt index according to ASTM D1238 of 5 to 30 g/10 min.

5. The moisture absorbent product of claim 1, wherein the metal stearate is at least one selected from the group consisting of calcium stearate and magnesium stearate.

6. A release resistant moisture absorbent being granule-shaped and consisting essentially of:
   (A) a moisture absorbent material consisting of at least one selected from the group consisting of magnesium chloride, calcium chloride, and sodium carbonate;
   (B) a curable inorganic material consisting of at least one selected from the group consisting of calcium oxide, magnesium oxide having a particle size of 20 to 80 mesh, and magnesium oxide having a particle size of 200 to 500 mesh; and
   (C) an additive consisting of at least one polymer wax selected from the group consisting of polyethylene wax, polypropylene wax, polyamide wax, carnauba wax, paraffin wax, and polytetrafluoroethylene wax, and optionally at least one material selected from the group consisting of a low-density polyethylene resin and metal stearate.

* * * * *